United States Patent
Legrand

(10) Patent No.: US 7,829,002 B2
(45) Date of Patent: Nov. 9, 2010

(54) METHOD FOR THE PRODUCTION OF PLANT CUTTING FILAMENTS

(75) Inventor: Emmanuel Legrand, Villeneuve (FR)

(73) Assignee: Speed France (FR)

( * ) Notice: Subject to any disclaimer, the term of this patent is extended or adjusted under 35 U.S.C. 154(b) by 665 days.

(21) Appl. No.: 10/586,212

(22) PCT Filed: Jan. 19, 2004

(86) PCT No.: PCT/FR2004/000105

§ 371 (c)(1),
(2), (4) Date: Nov. 13, 2007

(87) PCT Pub. No.: WO2005/077143

PCT Pub. Date: Aug. 25, 2005

(65) Prior Publication Data

US 2008/0233398 A1   Sep. 25, 2008

(51) Int. Cl.
*D01D 5/12* (2006.01)
*D01D 5/16* (2006.01)
*D02G 3/44* (2006.01)
*D02J 1/22* (2006.01)

(52) U.S. Cl. .............. 264/210.2; 264/210.7; 264/210.8; 264/290.5; 264/290.7

(58) Field of Classification Search ................. 264/146, 264/210.2, 210.7, 210.8, 290.5, 290.7
See application file for complete search history.

(56) References Cited

U.S. PATENT DOCUMENTS

| | | | |
|---|---|---|---|
| 2,434,533 A | 1/1948 | Wurzburger | |
| 3,066,366 A | 12/1962 | Wyckoff et al. | |
| 3,679,541 A | 7/1972 | Davis et al. | |
| 3,708,967 A | 1/1973 | Geist et al. | |
| 3,720,055 A | 3/1973 | De Mestral et al. | |
| 3,826,068 A | 7/1974 | Ballas et al. | |
| 4,035,912 A | 7/1977 | Ballas et al. | |
| 4,043,037 A | 8/1977 | Okamoto et al. | |
| 4,054,992 A | 10/1977 | Ballas et al. | |
| 4,054,993 A | 10/1977 | Kamp et al. | |

(Continued)

FOREIGN PATENT DOCUMENTS

AU   502953   8/1979

(Continued)

OTHER PUBLICATIONS

International Search Report for PCT/FR2004/000105 dated Sep. 29, 2004.

(Continued)

*Primary Examiner*—Leo B Tentoni
(74) *Attorney, Agent, or Firm*—Alston & Bird LLP

(57) ABSTRACT

The invention relates to a method for the production of a cutting filament for a device used to cut vegetation such as a trimmer or border cutter. The filament is made of a synthetic material having extended molecular chains. According to the invention, (a) the filament is brought to a controlled viscous state, (b) the filament is stretched according to the length thereof in order to perform a first longitudinal molecular orientation, (c) a cross-sectional change, resulting in a partial reorientation of molecular chains in a transversal direction, is imposed upon the filament, whereupon filaments having multiple molecular orientations are produced, having improved mechanical properties (e.g. a better resistance to tearing).

14 Claims, 3 Drawing Sheets

U.S. PATENT DOCUMENTS

| | | | |
|---|---|---|---|
| 4,062,114 A | 12/1977 | Luick | |
| 4,067,108 A | 1/1978 | Ballas | |
| 4,104,797 A | 8/1978 | Ballas | |
| 4,118,865 A | 10/1978 | Jacyno et al. | |
| 4,126,990 A | 11/1978 | Fisher et al. | |
| 4,172,322 A | 10/1979 | Ballas | |
| 4,177,561 A | 12/1979 | Ballas | |
| 4,185,381 A | 1/1980 | Palmieri et al. | |
| 4,186,239 A | 1/1980 | Mize et al. | |
| 4,199,926 A | 4/1980 | Petty | |
| 4,209,902 A | 7/1980 | Moore et al. | |
| 4,238,866 A | 12/1980 | Taylor | |
| 4,271,595 A | 6/1981 | Rahe | |
| 4,282,653 A | 8/1981 | Comer et al. | |
| 4,301,642 A | 11/1981 | Thurber | |
| 4,335,510 A | 6/1982 | Close et al. | |
| 4,362,007 A | 12/1982 | Kennedy et al. | |
| 4,367,587 A | 1/1983 | Kilmer | |
| 4,411,069 A | 10/1983 | Close et al. | |
| 4,685,279 A | 8/1987 | Gullett | |
| 4,726,176 A | 2/1988 | McGrew | |
| 4,756,146 A | 7/1988 | Rouse | |
| 4,835,867 A | 6/1989 | Collins et al. | |
| 4,852,258 A | 8/1989 | Foster | |
| D303,603 S | 9/1989 | Zimmerman | |
| 4,869,055 A | 9/1989 | Mickelson | |
| 4,905,465 A | 3/1990 | Jones et al. | |
| 5,048,278 A | 9/1991 | Jones et al. | |
| 5,049,347 A * | 9/1991 | Magill et al. | 264/280 |
| 5,220,774 A | 6/1993 | Harbeke et al. | |
| 5,276,968 A | 1/1994 | Collins et al. | |
| 5,398,416 A | 3/1995 | Mackey | |
| D358,535 S | 5/1995 | Skinner | |
| 5,411,805 A * | 5/1995 | Magill | 428/411.1 |
| 5,430,943 A | 7/1995 | Lee | |
| 5,433,006 A | 7/1995 | Taguchi | |
| D364,079 S | 11/1995 | Skinner | |
| 5,463,815 A | 11/1995 | Fogle | |
| 5,524,350 A | 6/1996 | Boland | |
| D376,078 S | 12/1996 | Skinner | |
| D376,739 S | 12/1996 | Skinner | |
| D379,052 S | 5/1997 | Skinner | |
| 5,687,482 A | 11/1997 | Behrendt | |
| 5,709,942 A | 1/1998 | Leydon et al. | |
| 5,713,191 A | 2/1998 | Welton | |
| 5,758,424 A | 6/1998 | Iacona et al. | |
| 5,761,816 A | 6/1998 | Morabit et al. | |
| 5,765,287 A | 6/1998 | Griffini et al. | |
| 5,836,227 A | 11/1998 | Dees et al. | |
| 5,852,876 A | 12/1998 | Wang | |
| 5,852,879 A | 12/1998 | Schumaier | |
| 5,855,068 A | 1/1999 | Zilly et al. | |
| 5,887,348 A | 3/1999 | Iacona et al. | |
| 5,890,352 A | 4/1999 | Molina | |
| 5,896,666 A | 4/1999 | Iacona et al. | |
| 5,901,448 A | 5/1999 | Lingerfelt | |
| 5,979,064 A | 11/1999 | Kitz et al. | |
| 5,987,756 A | 11/1999 | Yates et al. | |
| 5,996,233 A | 12/1999 | Morabit et al. | |
| 6,018,840 A | 2/2000 | Guay et al. | |
| 6,032,442 A | 3/2000 | Paolo | |
| 6,035,618 A | 3/2000 | Fogle | |
| 6,045,911 A | 4/2000 | Legrand et al. | |
| 6,058,574 A | 5/2000 | Facey et al. | |
| 6,061,914 A | 5/2000 | Legrand | |
| 6,094,823 A | 8/2000 | Brown et al. | |
| 6,108,914 A | 8/2000 | Sheldon | |
| 6,119,350 A | 9/2000 | Sutliff et al. | |
| 6,124,034 A | 9/2000 | Proulx et al. | |
| RE36,940 E | 11/2000 | Fogle | |
| 6,148,523 A | 11/2000 | Everts et al. | |
| 6,161,292 A | 12/2000 | Morabit et al. | |
| 6,171,697 B1 | 1/2001 | Legrand | |
| 6,240,643 B1 | 6/2001 | Civalleri | |
| 6,279,235 B1 | 8/2001 | White et al. | |
| 6,314,848 B2 | 11/2001 | Morabit et al. | |
| 6,347,455 B2 | 2/2002 | Brant et al. | |
| 6,401,344 B1 | 6/2002 | Moore et al. | |
| 6,519,857 B1 | 2/2003 | Proulx et al. | |
| 6,560,878 B2 | 5/2003 | Skinner et al. | |
| 6,581,292 B2 | 6/2003 | Allis | |
| 6,601,373 B1 | 8/2003 | Legrand | |
| 6,630,226 B1 | 10/2003 | Legrand | |
| 6,874,235 B1 | 4/2005 | Legrand | |
| 6,910,277 B2 | 6/2005 | Proulx et al. | |
| 6,912,789 B2 | 7/2005 | Price, III | |
| 6,928,741 B2 | 8/2005 | Proulx et al. | |
| 6,944,956 B1 | 9/2005 | Fogle | |
| 7,000,324 B2 | 2/2006 | Fogle | |
| 7,111,403 B2 | 9/2006 | Moore | |
| 7,210,231 B2 | 5/2007 | Legrand | |
| 7,257,898 B2 | 8/2007 | Iacona | |
| 7,370,424 B2 | 5/2008 | Legrand | |
| 2001/0014394 A1 * | 8/2001 | Soane et al. | 428/364 |
| 2001/0027610 A1 | 10/2001 | Wheeler et al. | |
| 2002/0023356 A1 | 2/2002 | Skinner et al. | |
| 2002/0157200 A1 * | 10/2002 | Galantai | 15/104.05 |
| 2003/0033718 A1 | 2/2003 | Alliss | |
| 2003/0200662 A1 | 10/2003 | Moore | |
| 2004/0128840 A1 | 7/2004 | Proulx et al. | |
| 2005/0028390 A1 | 2/2005 | Legrand | |
| 2005/0081389 A1 | 4/2005 | Legrand | |
| 2005/0172501 A1 | 8/2005 | Fogle | |
| 2005/0188547 A1 | 9/2005 | Legrand | |
| 2005/0229402 A1 | 10/2005 | Iacona | |
| 2007/0123092 A1 | 5/2007 | Legrand | |

FOREIGN PATENT DOCUMENTS

| | | |
|---|---|---|
| DE | 1 704 986 | 6/1971 |
| DE | 1704986 | 6/1971 |
| DE | 43 21 650 | 10/1994 |
| DE | 196 32 721 | 2/1998 |
| DE | 198 17 883 | 11/1999 |
| DE | 19817883 | 11/1999 |
| EP | 0 824 854 | 2/1998 |
| EP | 0 867 108 | 9/1998 |
| EP | 1 057 396 | 12/2000 |
| EP | 1 088 476 | 4/2001 |
| EP | 1 129 609 | 9/2001 |
| FR | 1.319.050 | 1/1963 |
| FR | 2 658 698 | 8/1991 |
| FR | 2 793 648 | 11/2000 |
| JP | 63-59812 | 3/1988 |
| JP | 7-184446 | 7/1995 |
| NL | 8302111 | 1/1985 |
| WO | WO 97/19584 | 6/1997 |
| WO | WO 97/43469 | 11/1997 |
| WO | WO 99/40773 | 8/1999 |

OTHER PUBLICATIONS

International search report for PCT Application No. PCT/FR2004/001105; Filed May 14, 2004; Date of Completion Sep. 29, 2004; Date of Mailing Oct. 7, 2004.

The Written Opinion for PCT Application No. PCT/FR2004/001105; Filed May 14, 2004; Date of Completion Sep. 29, 2004; Date of Mailing Oct. 7, 2004.

* cited by examiner

METHOD FOR THE PRODUCTION OF PLANT CUTTING FILAMENTS

BACKGROUND OF THE INVENTION

1) Field of the Invention

The present invention relates in general to plant cutting apparatus such as grass trimmers, edge trimmers and the like, and aims more particularly at new cutting filaments for such apparatus.

2) Description of Related Art

A cutting filament is usually made by extrusion/drawing of polyamide, and significant advances in these filaments have been known for some years: shapes adapted to reduce noise, improve cutting efficiency, etc., strands made of several materials to improve cutting efficiency, improving biodegradability, reducing cost, etc.

However, all the known filaments are still basically made by the same extrusion/drawing technique in which, at a given stage of the process, or on several occasions, the filament at a temperature at which it has a controlled viscosity is subjected to a longitudinal stretching.

The consequence of this is to give the molecular chains an average orientation extending in the longitudinal direction of the filament, in order to give it a high tensile strength and limit breakages during work.

BRIEF SUMMARY OF THE INVENTION

The object of the present invention is to offer the cutting filaments new possibilities of mechanical improvement based on a selective and controlled orientation of the molecular chains.

having elongated molecular chains, characterized in that it comprises the following steps:
(a) bringing the filament to a state of controlled viscosity,
(b) drawing the filament lengthwise to produce a first longitudinal molecular orientation,
(c) imposing on the filament a change of cross section capable of partially reorienting the molecular chains in a transverse direction.

Certain preferred, but nonlimiting, aspects of this method are as follows:
the method also comprises the step consisting in:
(d) imposing on the filament a second change of cross section capable of causing a second partial reorientation of the molecular chains in a transverse direction.
the second change of cross section is made in a general direction substantially identical to that of the first change of cross section.
the second change of cross section is made in a general direction substantially orthogonal to that of the first change of cross section.
the second change of cross section is made partially in a general direction substantially identical to that of the first change of cross section and partially in a general direction substantially orthogonal to that of the first change of cross section.
the filament has, before the implementation of step (c), a uniform cross section whose dimensions in two orthogonal directions are similar.
the step (c) comprises a flattening of the filament.
the step (d) comprises an at least local flattening of the filament.
the step (c) comprises a localized flattening and a localized thickening of the filament.
the change of cross section, or at least the last change of cross section, of the filament is capable of forming a filament comprising a body and at least one wing protruding from the body.
the change of cross section of the filament, or at least one of the changes of cross section, comprises forcing the filament through a series of dies of progressively different sections.
the change of cross section of the filament, or at least one of the changes of cross section, comprises forcing the filament through a single die of variable section.
the method also comprises a step of cutting the filament whose section has been changed into a plurality of individual subfilaments in the longitudinal direction of the filament.

According to a second aspect, the invention proposes a cutting filament for a plant cutting apparatus such as a grass trimmer or edge trimmer, the filament being made of a synthetic material with elongated molecular chains such as a polyamide, characterized in that, in at least one zone of the cross section of the filament, the orientation of the molecular chains diverges from a longitudinal orientation.

Certain preferred, but nonlimiting, aspects of this filament are as follows:
the filament comprises a body and at least one wing protruding from the body, and said wing forms a zone in which the orientation of the molecular chains diverges from a longitudinal orientation.
the wing has a generally triangular cross section.
in the body of the filament, the molecular chains are oriented essentially in the longitudinal direction of the filament.
over most of its cross section, there are molecular chains oriented longitudinally and molecular chains oriented generally in a given transverse direction.
over most of its cross section, there are molecular chains oriented longitudinally, molecular chains oriented generally in a first given transverse direction and molecular chains oriented generally in a second given transverse direction.
the first and second transverse directions are essentially orthogonal to one another.

BRIEF DESCRIPTION OF THE SEVERAL VIEWS OF THE DRAWINGS

Other aspects, objects and advantages of the present invention will better appear on reading the following detailed description of preferred embodiments of the latter, given as a nonlimiting example and made with reference to the appended drawings in which.

DETAILED DESCRIPTION OF THE INVENTION

Figure 1:
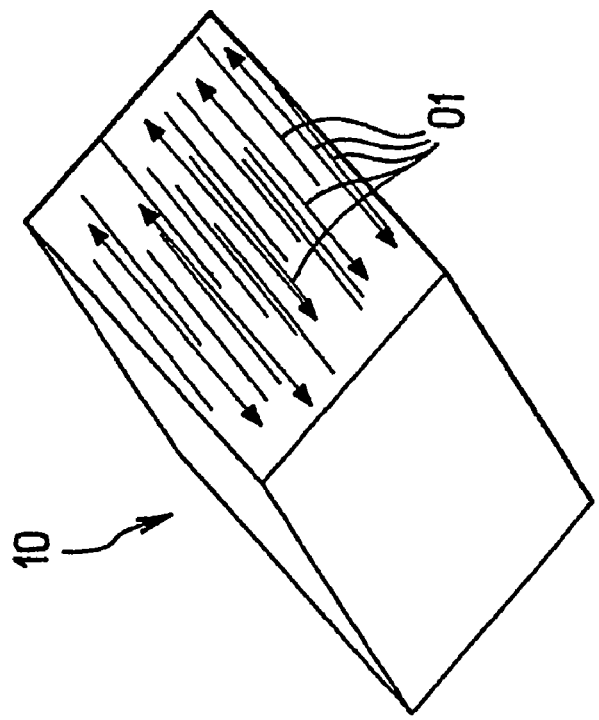
FIG. 1 is a view in perspective of a cutting filament according to the prior art.

Referring first of all to FIG. 1, it shows a cutting filament 10 for a grass trimmer, edge trimmer or similar element, which has in this instance a cross section that is square or somewhat like a flattened rhombus. Here it is made of polyamide 6 (PA6).

This filament has been manufactured by a conventional extrusion/drawing method, in which the filament, in a given state of viscosity (determined by controlling its temperature), has undergone a longitudinal drawing in a determined drawing ratio, so that the molecular chains of polyamide have mostly adopted an orientation 01 in the longitudinal direction of the filament.

This conventional method makes it possible to obtain cutting filaments which, due to this molecular orientation, have an excellent tensile strength, and therefore a resistance to shearing during the work of cutting plants.

Figure 2:
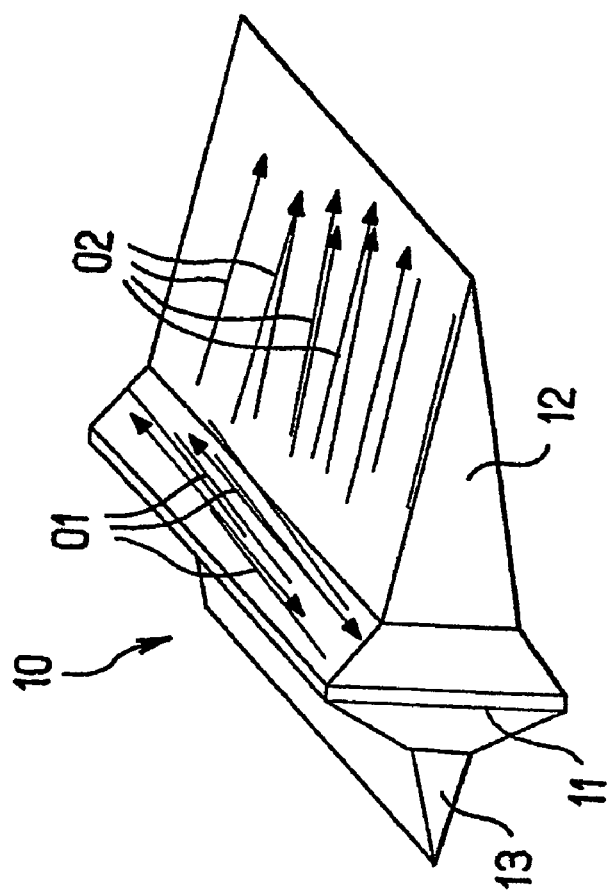
FIG. 2 is a view in perspective of a cutting filament according to an exemplary embodiment of the invention.

FIG. 2 illustrates a cutting filament made according to the invention. In this filament, there are a body part 11 and two wings 12, 13 situated laterally on either side of the body.

Via a method such as will be detailed hereinafter, the filament has:

in its central region, mainly at the body 11, a longitudinal molecular orientation 01, in the same manner as in the filament 10 of the prior art shown in FIG. 1;

in the region of at least one of its wings (here the wing 12 that is most prominent), a molecular orientation 02 that is mainly oriented transversely to the longitudinal direction of the filament.

Thus, thanks to this double orientation, the cutting filament has enhanced mechanical properties, with a plant cutting region furnished with a mainly transverse molecular orientation, hence a better resistance to wear by transverse wrenching of the filament material, and a body region retaining a mainly longitudinal molecular orientation, to retain overall a good tensile strength.

It will be observed here that, in the opposite wing 13, there is an intermediate molecular orientation between the longitudinal and transverse orientations.

It will also be observed that the working part 12 of the filament may be furnished with arrangements (teeth, specific anti-wear coating, etc.) designed to enhance the properties of the filament particularly with respect to cutting efficiency.

Figure 3:
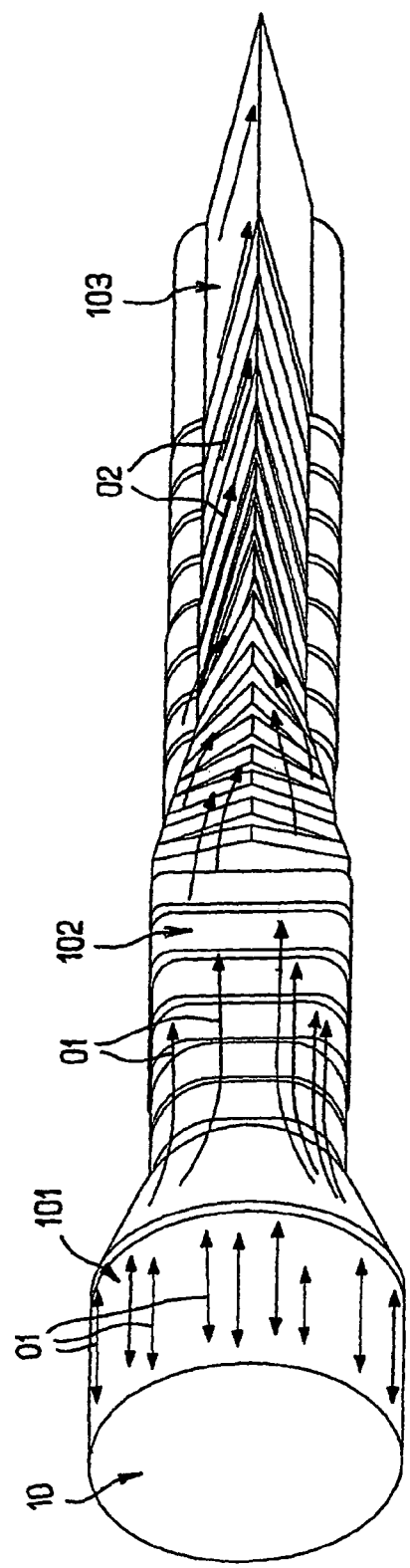
FIG. 3 illustrates the evolution of a filament in terms of cross section and molecular orientation during the implementation of a manufacturing method according to the present invention.

FIG. 3 illustrates the behavior of the filament during the implementation of a method according to the present invention.

A conventional extrusion/drawing method with circular die has made it possible to culminate in a cutting filament as illustrated in its phase 101, with a circular cross section and a mainly longitudinal molecular orientation 01.

Thanks to a set of dies producing a sort of mixing of the filament still in the viscous state, phase 102 culminates in a filament with a generally square cross section with rounded corners, in which the molecular orientation, although remaining mainly longitudinal, has begun to diverge from this direction. A new set of dies transforms the cross section of the filament from its generally square phase to a phase 103 that is, for example, that corresponding to the end product of FIG. 2.

During this operation, and owing in particular to the disorientation begun in the preceding step and the limited thickness of the lateral wing 12 of the filament, the molecular chains in this region have taken on a mainly transverse orientation 02 resulting from the progressive creep of the filament material toward this region.

This produces a filament corresponding to that of FIG. 2.

It will be observed here that, instead of a set of dies of constant section gradually bringing the transverse section of the filament from one shape to another, it is possible to provide dies of changing section to culminate essentially in the same type of result.

Figure 4:
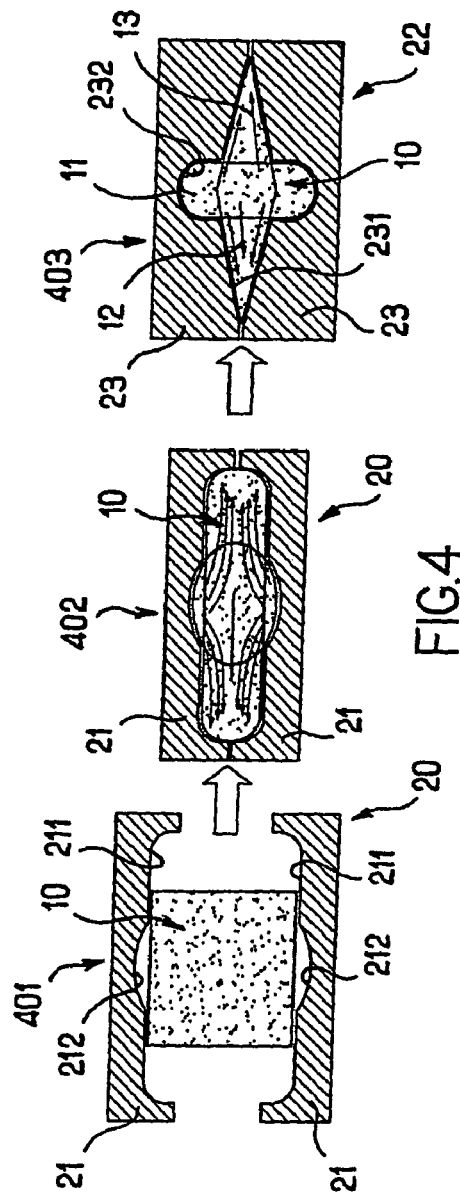

FIG. 4 illustrates a first concrete application of a method according to the present invention.

The point of departure is a filament 10 of square cross section obtained by a conventional extrusion/drawing method, resulting in a molecular orientation 01 that is mainly longitudinal.

This filament has, for example, a section of 4.5×4.5 mm.

In step 401, this strand enters a die 20 in two parts 21, 21 made identically and one of which is symmetrical with the other relative to a horizontal mid-plane.

Thus, each die part has a main working surface 211 that is substantially flat, in the middle of which a slight circular indentation 212 is formed.

The spacing between the two parts 21, 21 is initially such that the distance between the facing working surfaces is substantially equal to the height of the filament 10.

These two parts of the die are placed on the production line to come progressively closer to one another until there results the situation corresponding to step 402. Between steps 401 and 402, the filament is in a controlled state of viscosity, has been compressed vertically, causing a lateral creep of its material and hence a partial transverse (or oblique) reorientation of the molecular chains of the polyamide 6. In the present example, the general dimensions of the transition defined by the die in step 402 are approximately 1.75×8 mm.

The section of the filament is then again worked to pass from the die illustrated in step 402 to a die 22 as illustrated in connection with step 403, either in steps, or progressively in a variable geometry die.

Here again the die 22 comprises two identical parts 23, 23 that are symmetrical relative to a horizontal mid-plane, with a flattened V-shaped indentation 231 over the whole width and, at the base of this flattened V, a narrower channel 232 with a semicircular base.

This shape causes, on the one hand, a thinning of the lateral regions of the filament to a triangular shape, and, on the other hand, a thickening of its central region (whose dimensions are approximately 4×1.75 mm in the present example).

This has the effect of further accentuating the transverse orientation 02 given to the molecular chains of polyamide in the lateral regions of the filament. At the same time, it is observed that the central region of the filament has undergone, on the one hand, from step 401 to step 402, a horizontal flattening then, from step 402 to step 403, a flattening in the vertical direction, which has the effect of creating, in this region, a molecular multi-orientation favorable to the mechanical strength of the filament not only in its longitudinal direction but also in all the transverse directions.

This makes it possible in particular to reduce, or even eliminate, the phenomena of fraying of the cutting filament at its free end.

Figure 5:
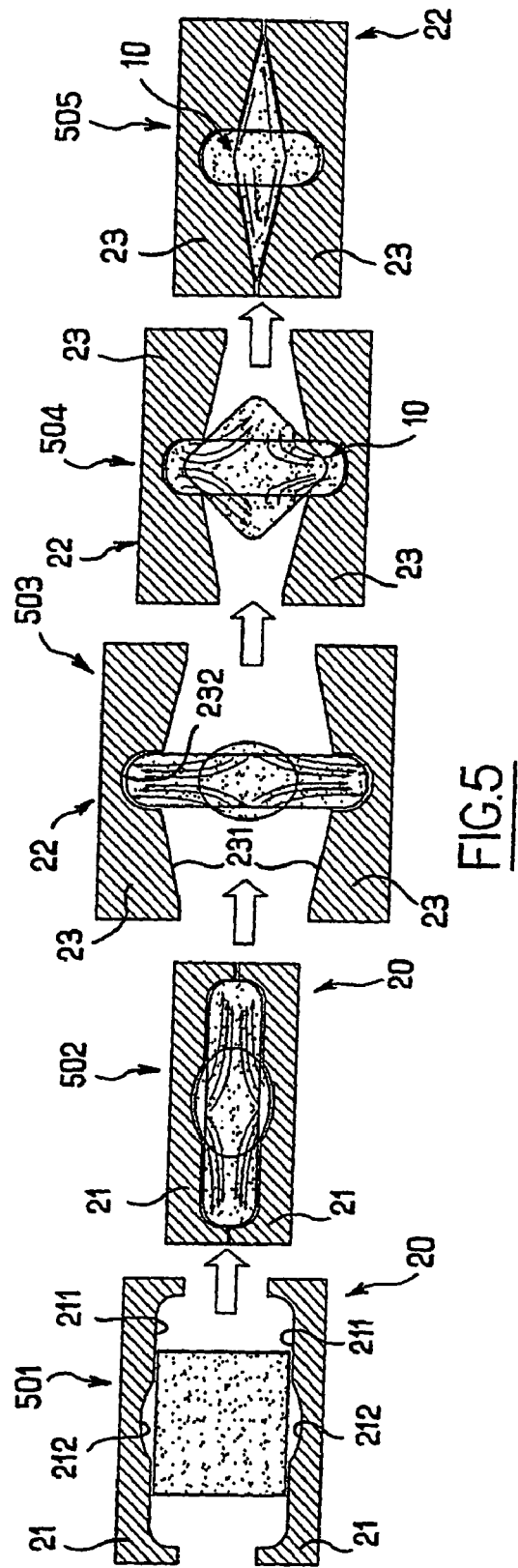

FIG. 5 illustrates a second exemplary embodiment of the method according to the invention, which aims to produce a cutting filament having the same contour as in the preceding example, but with further enhanced properties.

In this example, steps 501 and 502 are identical to steps 401 and 402 of the preceding example. After step 502, the filament is rotated through 90° before being engaged in a die 22 identical to that described with reference to FIG. 4, but whose two elements have been spaced further apart to be able to receive the flattened filament, then oriented vertically (step 503).

As a variant, the filament 10 retains its orientation but the die 22 is turned 90° relative to the illustration of FIG. 5.

The two parts of the die 22 are then brought progressively closer together (steps 504 and 505) in order therefore for the filament to be worked in a direction perpendicular to that in which it was worked between steps 501 and 502. As an example, the total height of the filament changes from approximately 8 mm (step 503) to approximately 4 mm (step 505).

The filament obtained at the end of step 505 has, in terms of contours, the same shape as that obtained at the end of step 403 of FIG. 4; the essential difference was the fact that it undergoes a double thinning, in two orthogonal directions (knowing that, as a variant, two directions that are oblique relative to one another can be provided).

The multi-orientation of the polyamide molecules is this accentuated.

Figure 6:
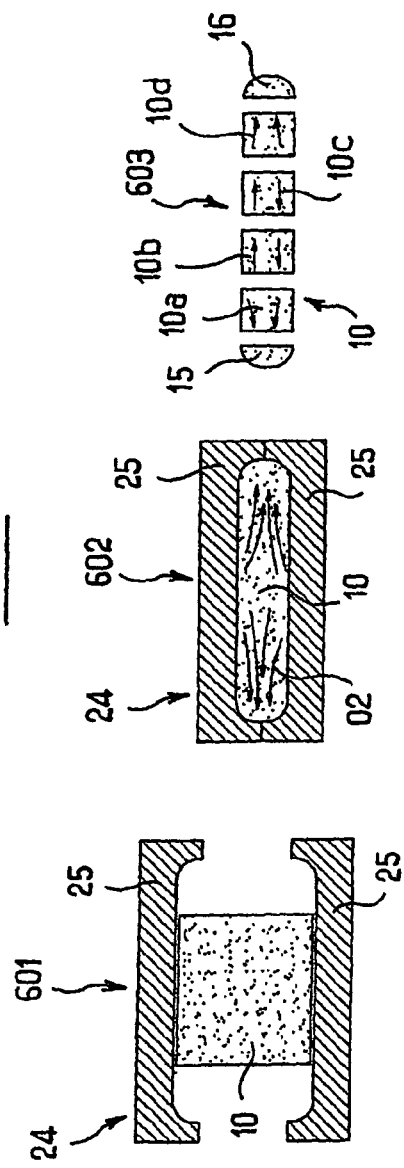
FIGS. 4 to 6 illustrate three examples of the implementation of a manufacturing method according to the present invention.

FIG. 6 illustrates another embodiment of the invention, which uses a die 24 with two elements 25 having flat facing surfaces 251.

In step 601, a filament 10 of generally square section is received between the two parts 25 of the die 24. Between steps 601 and 602, the two parts of the die are brought closer together, to culminate in a generally flat filament, whose thickness is, for example, between 2 and 4 mm, and whose width is typically equal to several times this thickness. During this operation, the orientation of the molecular chains has been partly transformed into a lateral orientation 02, as illustrated in step 602.

In step 603, the flattened filament, after being taken out of the die 24, is cut up with the aid of appropriate blades (not shown) into a plurality of filaments having the same height, but a reduced width. In the present example, this step produces four individual filaments 10a to 10d, with a generally square cross section. The small terminal parts 15 or 16 are scrapped or recycled.

In each filament, the molecular chains have an orientation that is no longer solely longitudinal. This provides better mechanical properties, particularly less tendency to fray, without undesirably degrading the tensile strength in the longitudinal direction.

According to a variant (not shown) of this embodiment, a first flattening of the filament can be achieved as in step 602, and a second flattening in an orthogonal direction (in the same spirit as in the embodiment of FIG. 5), in order to further accentuate the disorientation of the molecular chains of polyamide by carrying out this disorientation in an additional direction.

It will be noted here that the square section filaments obtained in step 603 may be either packaged for marketing as is, or undergo any other treatments, and particularly shaping treatments (formation of cutting teeth, etc.), coating, etc.

Naturally, the present invention is in no way limited to the embodiments described hereinabove and shown in the drawings, but those skilled in the art will be able to apply many variants and modifications thereto.

In particular, it is understood that the invention may be combined by those skilled in the art with many other enhancements generally known in the field of cutting filaments (filaments of a particular shape and/or poly-materials to enhance cutting efficiency, reduce operating noise, improve biodegradability, prevent sticking phenomena, etc.).

The invention claimed is:

1. A method of producing a cutting filament for a plant cutting apparatus, the filament being made of a synthetic material having elongated molecular chains and comprising a body and at least one wing protruding from the body, comprising the following steps:
    (a) bringing the filament to a state of controlled viscosity,
    (b) drawing the filament lengthwise to produce a first longitudinal molecular orientation in the body,
    (c) imposing on the filament a change of cross section so as to partially reorient the molecular chains in a transverse direction in the region of said at least one wing, wherein the change of cross section comprises forcing the filament through at least one die.

2. The method of claim 1, comprising a step consisting in:
    (d) imposing on the filament a second change of cross section so as to cause a second partial reorientation of the molecular chains in a transverse direction.

3. The method of claim 2, wherein the second change of cross section is made in a general direction substantially identical to that of the first change of cross section.

4. The method of claim 2, wherein the second change of cross section is made in a general direction substantially orthogonal to that of the first change of cross section.

5. The method of claim 2, wherein the second change of cross section is made partially in a general direction substantially identical to that of the first change of cross section and partially in a general direction substantially orthogonal to that of the first change of cross section.

6. The method of claim 1, wherein the filament has, before the implementation of step (c), a uniform cross section whose dimensions in two orthogonal directions are similar.

7. The method of claim 6, wherein the step (c) comprises a flattening of the filament.

8. The method of claim 1, wherein the change of cross section of the filament, or at least one of the changes of cross section, comprises forcing the filament through a series of dies of progressively different sections.

9. The method of claim 1, wherein the change of cross section of the filament, or at least one of the changes of cross section, comprises forcing the filament through a single die of variable section.

10. A method of producing a cutting filament for a plant cutting apparatus, the filament being made of a synthetic material having elongated molecular chains and comprising a body and at least one wing protruding from the body, comprising the following steps:
    (a) bringing the filament to a state of controlled viscosity,
    (b) drawing the filament lengthwise to produce a first longitudinal molecular orientation, the filament having a uniform cross section whose dimensions in two orthogonal directions are similar,
    (c) imposing on the filament a change of cross section so as to partially reorient the molecular chains in a transverse direction, with a flattening of the filament,
    (d) imposing on the filament a second change of cross section so as to cause a second partial reorientation of the molecular chains in a transverse direction, with at least local flattening of the filament,
    wherein at least one of the changes of cross section comprises forcing the filament through at least one die.

11. The method of claim 10, wherein the step (c) comprises a localized flattening and a localized thickening of the filament.

12. The method of claim 10, wherein the change of cross section, or at least the last change of cross section, of the filament forms the at least one wing protruding from the body.

13. The method of claim 10, wherein the change of cross section of the filament, or at least one of the changes of cross section, comprises forcing the filament through a series of dies of progressively different sections.

14. The method of claim 10, wherein the change of cross section of the filament, or at least one of the changes of cross section, comprises forcing the filament through a single die of variable section.

* * * * *